United States Patent [19]

Parks

[11] Patent Number: 5,129,384
[45] Date of Patent: Jul. 14, 1992

[54] BAKERY OVEN WITH ENHANCED AIR FLOW

[75] Inventor: James D. Parks, Olathe, Kans.

[73] Assignee: Reed Oven Company, Kansas City, Mo.

[21] Appl. No.: 754,077

[22] Filed: Sep. 3, 1991

[51] Int. Cl.$^5$ ............................................. F24C 15/32
[52] U.S. Cl. ................................. 126/21 A; 126/21 R; 99/447
[58] Field of Search ................... 126/21 R, 20, 21 A, 126/19 R, 41 R, 273 R; 219/400, 401, 388; 34/191, 196, 219, 197, 237, 238, 236, 212; 99/443–447; 432/200, 176, 199

[56] References Cited

U.S. PATENT DOCUMENTS

| 2,582,887 | 1/1952 | Sanford et al. | 126/21 A |
| 3,905,760 | 9/1975 | Johansson et al. | 219/400 |
| 4,109,636 | 8/1978 | Burge | 126/21 A |

FOREIGN PATENT DOCUMENTS

| 2519849 | 11/1975 | Fed. Rep. of Germany | 126/21 A |
| 2709068 | 9/1978 | Fed. Rep. of Germany | 126/21 A |
| 2535036 | 4/1984 | France | 126/21 A |
| WO84/01266 | 4/1984 | World Int. Prop. O. | 126/21 A |

Primary Examiner—James C. Yeung
Attorney, Agent, or Firm—Shook, Hardy & Bacon

[57] ABSTRACT

An air return system for a rotatable rack baking oven having a heat source and a blower associated therewith for providing a flow of heated air across a baking chamber of the oven. The outlet end of the blower is connected via ductwork to an air outlet vent which introduces the heated air into the baking chamber. The air outlet vent includes a lattice of fixed vanes which are elongated in the direction of intended air flow. This arrangement channels the heated air to exit normal to the outlet vent to maintain a well defined column of air with less turbulence. An air return vent is located opposite the air inlet vent and is operatively associated with the heating means and the inlet side of the blower. The air return vent includes a panel having a plurality of holes through which the air may be drawn. A number of return holes in the return vent are blocked such that their numbers vary in inverse proportion to the drawing force produced by the inlet of the blower. This produces a uniform draw of air from the baking chamber, aiding in the uniform flow across the chamber.

19 Claims, 3 Drawing Sheets

BAKERY OVEN WITH ENHANCED AIR FLOW

BACKGROUND OF THE INVENTION

1. Field of the Invention

The present, invention relates in general to baking ovens. In particular, the present invention relates to an improved air flow system for small bakery rack ovens.

2. Description of the Related Art

Baking ovens for use in small bakeries or the bakery sections of grocery stores have been known for many years. A particularly widespread design is exemplified by U.S. Pat. No. 3,537,405 to Verhoeven. This design includes a baking chamber sized to receive a tall rack containing multiple layers of goods to be baked. The rack is wheeled into the chamber and thereby engages a lifting and rotating mechanism which lifts the rack slightly off of the floor of the baking chamber and rotates the rack during the baking cycle.

The oven includes a conventional burner and a blower system which channels a high velocity of heated air across the baking chamber in a relatively narrow channel in relation to the circle defined by the rotating outer corners of the rack. By this arrangement the goods which are closest to the corner of the rack will be closer to the source of hot air, and will thus be subjected to higher heat, but pass through this section only periodically. Those baked goods near the center of the rack will be subjected to less heat, but this heat will be substantially constant. By this arrangement the baked goods are of a uniform quality.

While the theory behind the above-described oven is sound, the application of this theory is quite difficult. To achieve truly uniform quality of baking, it is necessary to provide a substantially uniform flow of heated air across the baking chamber. This is difficult to achieve because the heated air has a tendency to enter the chamber at a higher volumetric rate at the beginning of the outlet grid (typically at the top of the chamber). Additionally, it is difficult to maintain a flow of air substantially uniform in the lateral direction, as the air flow tends to expand outward into a wedge shape. Both of these variations from the optimum air flow reduce the baking quality and thus the amount of salable goods produced.

SUMMARY OF THE INVENTION

An object of the present invention is to provide a rotatable rack oven with improved air flow characteristics.

Another object of the present invention is to provide a rotatable rack oven with an improved air inlet vent which provides a well defined laminar air channel of expanded area.

A further object of the present invention is to provide an improved air return vent which provides a uniform draw of air from the baking chamber, substantially equivalent in size and shape to the inlet vent.

These and other objects are achieved by an air return system for a rotatable rack baking oven having a heat source and a blower associated therewith for providing a flow of heated air across a baking chamber of the oven. The outlet end of the blower is connected via ductwork to an air outlet vent which introduces the heated air into the baking chamber. The air outlet vent includes a lattice of fixed vanes which are elongated in the direction of intended air flow. The air outlet vent creates a static pressure loss, resulting in an increased positive pressure within the duct work. This arrangement channels the heated air to exit normal to the outlet vent to maintain a well defined column of air with uniform velocity and less turbulence to move across the baking chamber.

An air return vent is located opposite the air inlet vent and is operatively associated with the heating means and the inlet side of the blower. The air return vent includes a panel having a plurality of holes through which the air may be drawn. A number of air return holes in the return vent are blocked such that their numbers vary in inverse proportion to the drawing force produced by the inlet of the blower. This produces a uniform draw of air from the baking chamber, aiding in the uniform flow across the chamber.

BRIEF DESCRIPTION OF THE DRAWINGS

The objects and features of the invention noted above are explained in more detail with reference to the drawings in which like reference numerals denote like elements, and in which.

DETAILED DESCRIPTION OF THE INVENTION

Figure 1:
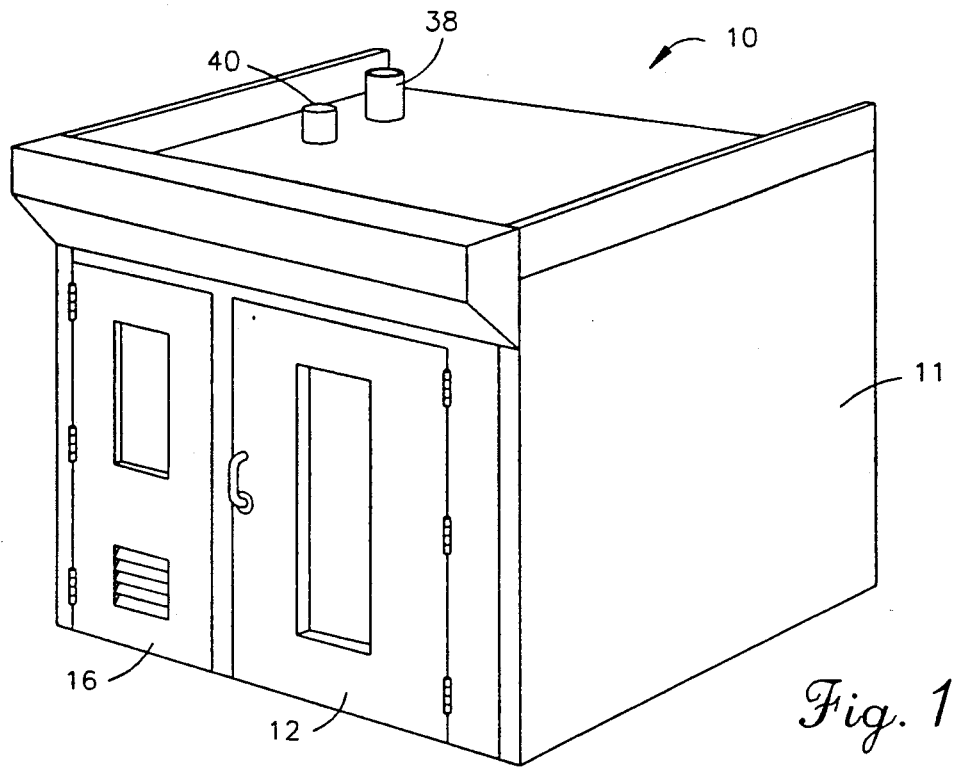
FIG. 1 is a perspective view of an oven according to the present invention.

With reference to FIG. 1, reference numeral 10 generally designates an oven for use in small bakeries, deli's, hotels or the bakery departments of grocery stores, which is preferably a rotatable rack oven. The oven is a self-contained unit having exterior walls 11, a roof and an inlet door 12 leading to a baking chamber 14. The oven 10 also includes a control room door 16 providing access to a control room housing the temperature and air flow controls.

Figure 2:
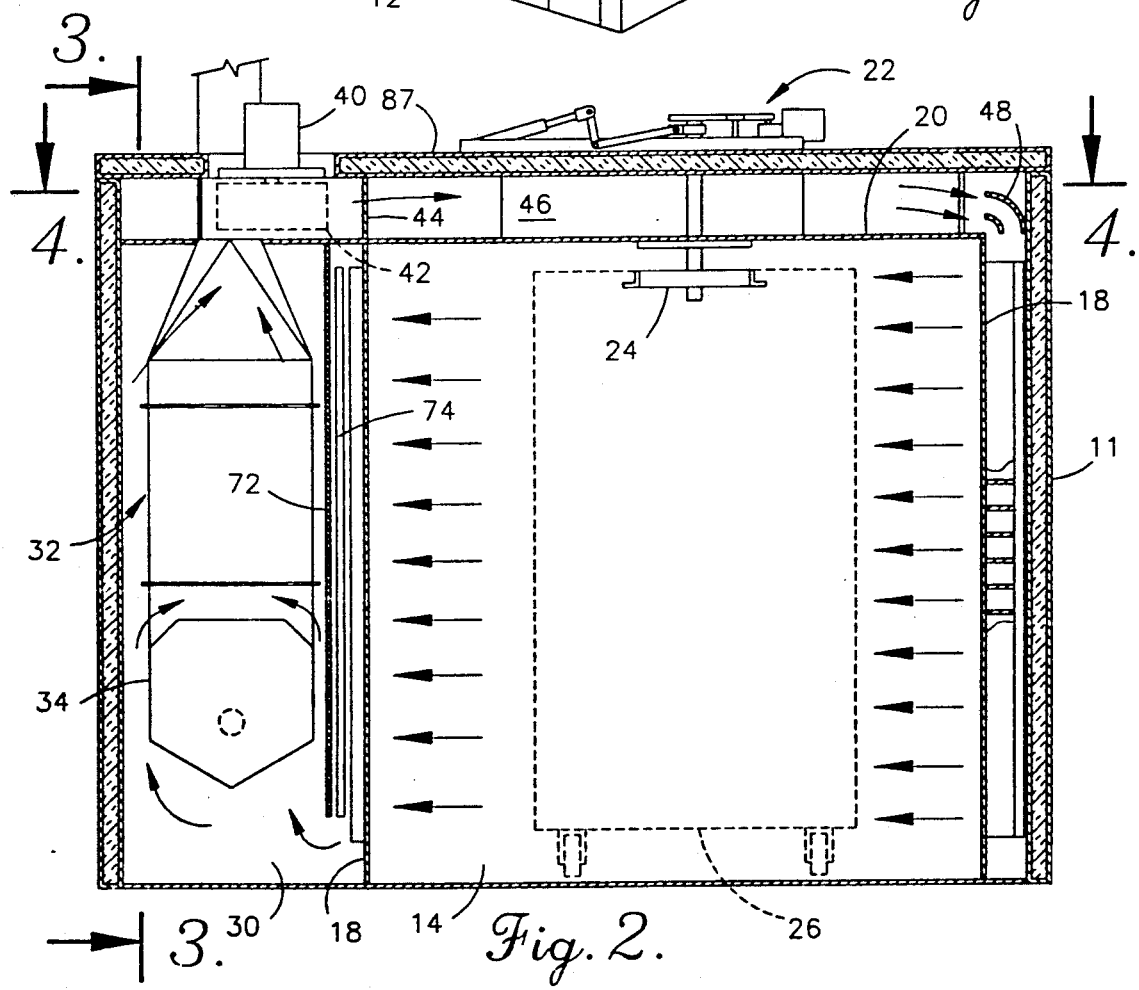
FIG. 2 is a front cross sectional view of the oven of FIG. 1.
Figure 6:
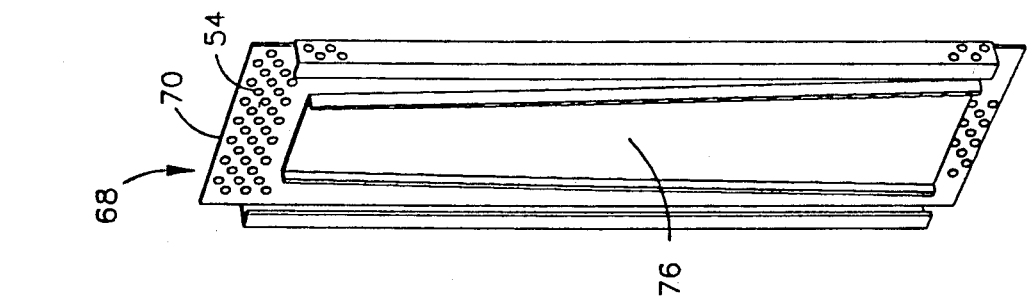
FIG. 6 is a perspective view of an outlet vent according to the present invention.

With reference to FIG. 2, it may be seen that the exterior walls of the oven 10 include insulation to reduce the heat transfer through the walls 11 to maintain the desired temperature within the baking chamber 14 and to reduce energy consumption. The baking chamber 14 is housed within the walls 11 of the oven and is defined by baking chamber side walls 18 and a baking chamber ceiling 20. In its preferred form, the oven 10 includes a rack rotation device generally indicated by reference numeral 22. This rack rotation device consists of a rack engagement member 24 within the baking chamber 14, which member is formed to mate with a top portion of a rack 26 used to hold the goods to be baked. Rotation device 22 also includes a motor and lift mounted above an insulated ceiling 87 of the oven 10. The device 28 is operatively connected to the engagement member 24 such that when a rack 26 is in engagement with the engagement member 24 the device 28 will lift the rack 26 a short distance above the floor of the oven 10 and rotate the entire rack during the baking process.

Adjacent to the baking chamber 14, but within the walls 11 of the oven, is a heating cell 30 which houses an appropriate heat exchanger 32. The heat exchanger 32 includes a combustion chamber 34 containing at least one burner which produces heat by combustion. The hot combustion gases are led from the combustion chamber 34 through a series of serpentine heat exchange pipes 36 before finally exiting from a flue 38. The flue 38 is appropriately vented to atmosphere.

Figure 4:
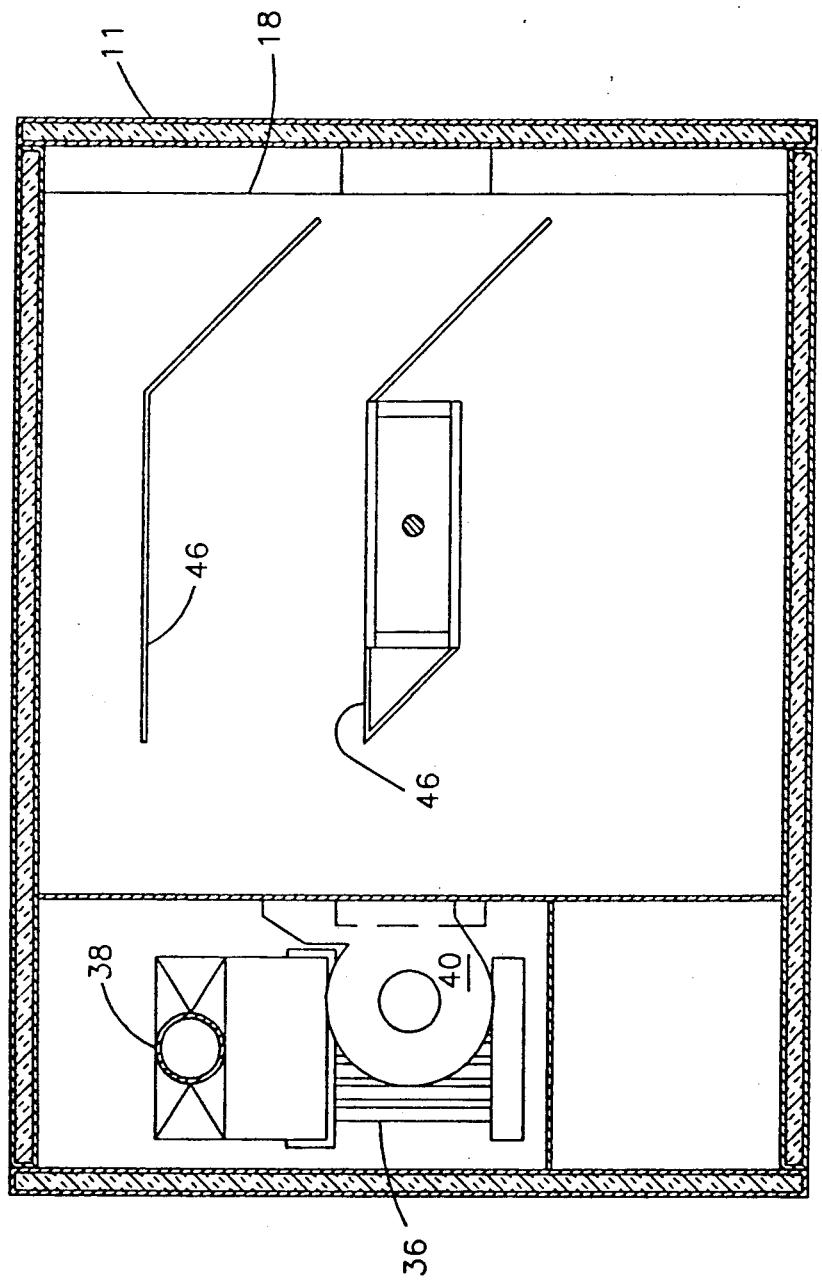
FIG. 4 is a cross sectional view along line 4—4 of FIG. 2.

A blower 40 is mounted adjacent the top of the heating cell 30 such that the blower may receive air at its inlet from the heating cell, and in particular from an area adjacent the heat exchange pipes 36. As is best shown in FIGS. 2 and 4, the outlet 44 of the blower is directed above the ceiling 20 of the baking chamber 14, but within the oven 10. Mounted to the upper surface of the ceiling 20 are appropriate guide walls 46 which serve to channel the air exiting the blower 40 around the lift shaft of the motor and lift/device and towards the opposite side wall 18 of the baking chamber 14. At this location are located at least one, and possibly several, curved guide vanes 48 which served to channel the air passing above the ceiling 20 into the space between the wall 11 and side wall 18.

Figure 5:
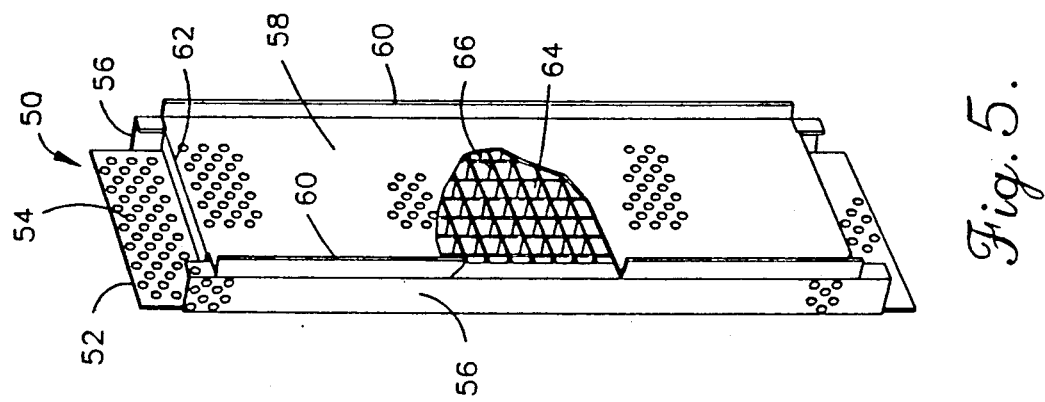
FIG. 5 is a perspective view in partial cutaway of an inlet vent according to the present invention.

Located below the guide vanes 48 and in communication with the air flow from the blower 40, is an air inlet vent 50. As is best shown in FIG. 5, the air inlet vent 50 includes a front plate 52 which will define a portion of the side wall 18 opposed to the heating cell 30. The front plate 52 is formed of a perforated metal such that numerous vent holes 54 extend therethrough. Extending rearwardly from the lateral edges of the front plate 52 are side plates 56. The side plates are of such a length that their rear edge is spaced inwardly from the interior surface of the adjacent wall 11 of the oven 10. Extending between the rear edges of the side plates 56 is a rear plate 58. The rear plate 58 preferably includes a pair of rearwardly extending buffer flanges 60 extending along the lateral edges thereof, and a pair of inwardly extending slat flanges 62 (one of which is shown) extending along the longitudinal ends of the rear plate 58. As with the front plate 52, the side plates 56, rear plate 58, buffer flanges and slat flanges 60 and 62 are all formed of perforated metal providing a plurality of vent holes 54 therethrough.

As is best shown in FIG. 2, when the inlet vent 50 is operatively located in the oven 10 the front plate 52 extends within the plane of the side wall 18, as noted above. The rear edges of the buffer flanges 60 are spaced from the interior face of the wall 11 such that the wall 11 and rear plate 58 define a duct into which the air from blower 40 may be channeled. This air will interact with steam baffle generators located on either side of rear plate 50 to produce moist air to aid in the baking process, as is known in the art, and is subject to a positive pressure due to blower 40. This pressurized air will pass through the vent holes 54 in rear plate 58 and into the interior of the air inlet vent 50 and outwardly through the vent holes of the front plate 52 to enter the baking chamber 14.

As is apparent from the description above, a three dimensional cavity is formed within the air inlet vent 50. This cavity is filled with a series of longitudinally spaced and vertically extending first slats 64 and a series of vertically spaced and laterally extending second slats 66 which therefore define a lattice of ducts within the air inlet vent 50. These slats extend across at least substantially all of the depth of the interior cavity of the air inlet vent and serve as numerous small ducts extending normal to the plane of the wall 18 containing the inlet vent 50.

These slats and the ducts they define serve to remove any lateral or downward inertia from the air flow passing downwardly into the channel defined by the wall 18 and buffer flanges 60. As such, the air exiting the air inlet vent 50 does so substantially normal to the front plate 52 (and thus the wall 18). This produces superior air flow characteristics and helps to maintain a well-defined column of air passing across the baking chamber 14. Due to this well defined column of air, the volume of air flow is increased, but velocity is significantly reduced with respect to prior art devices. For example, the volumetric flow of the present invention may be 1.13 m$^3$/s (2400 cfm) compared to 0.71 m$^3$/s (1500 cfm) for the prior art, while the velocity of the present invention is 2.8-3.8 m/s (550-750 fpm) compared to 7.6-12.7 m/s (1500-2500 fpm) for the prior art. This allows the oven of the present invention to be employed with certain baked goods, such as meringue, which were unsuitable for baking in prior art ovens of this type. Additionally, the reduced velocity of the air greatly increases the likelihood of producing a laminar air flow over the goods to be baked, providing improved heat transfer.

Figure 3:
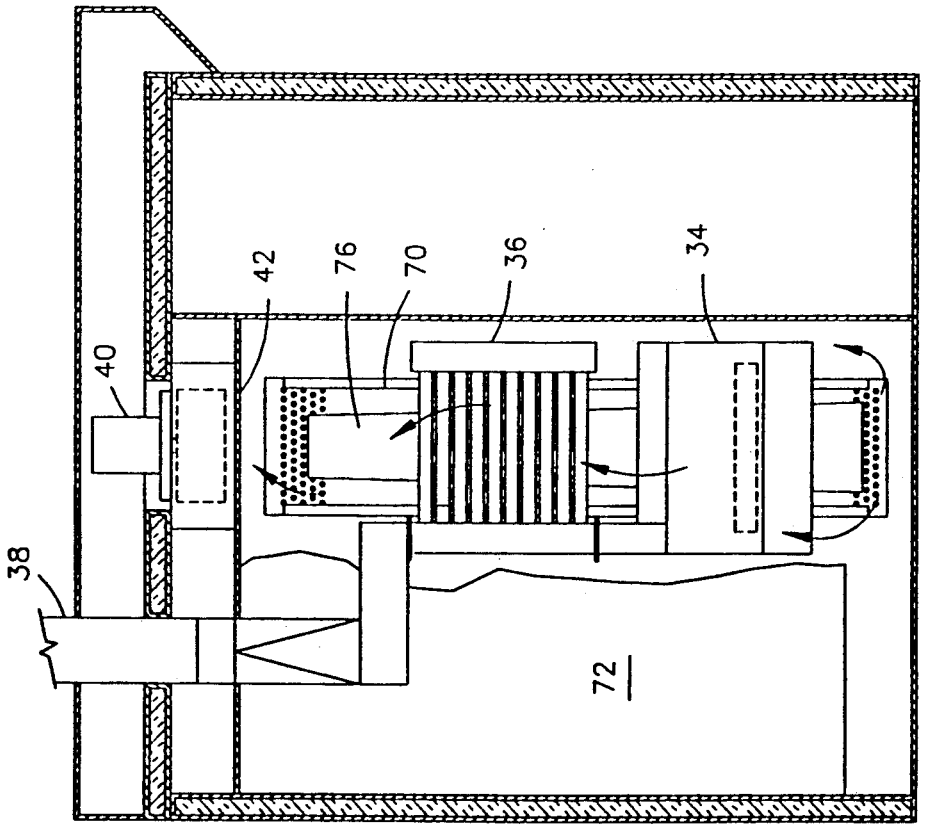
FIG. 3 is a cross sectional view along line 3—3 of FIG. 2.

To further enhance the air flow across the baking chamber 14 the oven 10 includes an improved air return vent 68. The air return vent is of substantially the same size as air inlet vent 50 and is placed in an opposing relationship to define a portion of an opposite wall 18 of the baking chamber 14. This location also places the air return vent 68 adjacent the heat exchanger 32 and combustion chamber 34, and below the intake of the blower 40, as is best shown in FIG. 3. Intermediate the air return vent and the furnace is a vent wall 72 which blocks the flow of air passing from the air return vent from exiting at any point except at the bottom of the vent wall. To accomplish this the vent wall may extend from the ceiling of the heating cell to a position spaced from the floor, and from wall to wall of the heating cell. Alternatively, the vent wall may be formed to be approximately the same size as the air return vent.

By this arrangement, air will be drawn towards the intake of the blower 40 through the air return vent 68. The drawing of the air through the air return vent will aid in producing a well defined column of air through the baking chamber 14. The air drawn through the return vent must pass under the lower edge of the vent wall 72, however, and this ensures that the air will be drawn past the heat exchange pipes 36 to be heated prior to entering the inlet of the blower 40. To provide further heat exchange with the air, a heat sink 74, in the form of solid metal rods, may be placed between the air return vent and the vent wall such that air may flow through and on either side of the heat sink to receive additional heat therefrom.

The air return vent 68 is primarily composed of a main plate 70 which is formed of metal and includes a plurality of vent holes 54, as were present in the air inlet vent 50. To further enhance the uniformity of the air flow passing through the baking chamber 14, the air return vent 68 is formed such that air is uniformly drawn therein. In this regard it is noted that the air may be drawn by the blower only from beneath the vent wall 72. Because of this the drawing force is greatest near the lower end of the air return vent, which is nearest the open bottom of the vent wall.

To reduce this effect the vent holes are provided in the main plate 70 in inverse proportion to the amount of the drawing force. Therefore, where the drawing force is strong, near the opening of the vent wall, the main plate is provided with relatively few vent holes. However, where the drawing force is weak, far from the opening in the vent wall, the main plate has a relatively large number of vent holes.

In this manner a uniform amount of air is drawn across the vertical extent of the air return vent. This uniform draw serves to improve the uniformity of the air flow across the baking chamber. This is because the draw generally helps to inhibit the air stream from forming a wedge shape and maintains it in a uniform column. The uniformity of the present draw, in combination with the uniform and well directed air stream exiting from the air inlet vent, ensures that no single portion of the air stream will form too great of a wedge shape, which may have a degrading effect upon other portions of the air stream.

A preferred method of achieving the varying number of vent holes in the main plate 70 is to provide a uniform array of holes in the main plate, but to block a number of the holes such that there is a varying number of effective vent holes. This may be achieved by fixing a solid block plate 76 to the main plate, with the block plate having a peripheral configuration to provide the blocking of the necessary number and placement of holes. In the embodiment shown, the width of the block plate increases towards the opening in the vent wall, such that fewer holes are effectively available near this opening than are available far from this opening. It should be realized that other block plate configurations are possible, especially if the opening in the vent wall is not adjacent the bottom of the air return vent (and block plate).

It should also be noted that the use of a separate block plate is not strictly necessary. For example, the main plate 70 may be provided with vent holes 54 only in certain portions of its surface which correspond to those necessary to provide a uniform draw. Alternatively, the vent hole spacing may be uniform, with the vent hole diameter being varied.

From the foregoing it will be seen that this invention is one well adapted to attain all ends and objects herein above set forth together with the other advantages which are obvious and which are inherent in the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. In a bakery oven having a baking chamber defined by a plurality of walls, a heat source for heating air received from said baking chamber, a blower for receiving heated air from one side of said chamber and directing an air stream to an opposite side of said chamber, the improvement comprising:

an air inlet vent located on said opposite side and including means for imparting a substantially uniform flow to said air stream in a direction substantially perpendicular to the plane of said air vent, and toward said one side, as said air stream moves from said opposite side to said one side, wherein said flow imparting means includes a series of first slats spaced in a first direction and extending in a second direction, and a series of second slats spaced in a direction at an angle to said second direction, thereby defining a plurality of ducts each extending substantially directly towards said one side of the baking chamber, whereby air passing through said ducts will be directed substantially directly towards said one side of the baking chamber, and wherein said air inlet vent further includes a front plate and rear plate, said slats are located between said plates, and said plates include a plurality of vent holes extending therethrough.

2. The improvement of claim 1, wherein said second slats are spaced in a direction substantially perpendicular to said first direction and extend substantially perpendicular to said second direction.

3. The improvement of claim 1, wherein said front plate defines a portion of one of said walls of said baking chamber, and said ducts extend substantially normal to said front and rear plates.

4. The improvement of claim 3, wherein said second slats are spaced in a direction substantially perpendicular to said first direction and extend substantially perpendicular to said second direction.

5. The improvement of claim 1, further comprising:

an air return vent located on said one side, said vent including a plurality of vent holes extending therethrough and spaced across the surface of said air return vent whereby air is drawn through said air return vent in response to a drawing force exerted by said blower, the number of said vent holes in a given unit area of said air return vent being generally inversely proportional to the drawing force exerted upon said given unit area.

6. The improvement of claim 5, wherein said second slats are spaced in a direction substantially perpendicular to said first direction and extend substantially perpendicular to said second direction.

7. The improvement of claim 5, wherein said front plate defines a portion of one of said walls of said baking chamber, and said ducts extend substantially normal to said front and rear plates.

8. The improvement of claim 7, wherein said second slats are spaced in a direction substantially perpendicular to said first direction and extend substantially perpendicular to said second direction.

9. The improvement of claim 5, wherein said air return vent includes a main plate having a plurality of vent holes extending therethrough and substantially uniformly spaced across the surface of said main plate, and further includes a block plate mounted on said main plate in covering relation thereto, said block plate thereby blocking ones said vent holes in said main plate which are within the periphery of said block plate, whereby air is drawn through remaining ones of said vent holes in said main plate in response to a drawing force exerted by said blower, said block plate having a peripheral configuration such that the number of said vent holes in a given unit area of said air return vent is generally inversely proportional to the drawing force exerted upon said given unit area.

10. The improvement of claim 9, wherein said block plate has a generally trapezoidal peripheral configuration.

11. The improvement of claim 9, wherein said second slats are spaced in a direction substantially perpendicular to said first direction and extend substantially perpendicular to said second direction.

12. The improvement of claim 9, wherein said air inlet vent further includes a front plate and a rear plate, said slats are located between said plates, and said plates include a plurality of vent holes extending therethrough.

13. The improvement of claim 12, wherein said front plate defines a portion of one of said walls of said baking chamber, and said ducts extend substantially normal to said front and rear plates.

14. The improvement of claim 13, wherein said second slats are spaced in a direction substantially perpendicular to said first direction and extend substantially perpendicular to said second direction.

15. In a bakery oven having a baking chamber defined by a plurality of walls, a heat source for heating air received from the bakery chamber, a blower for receiving heated air from one side of said chamber and directing an air stream to an opposite side of said chamber, the improvement comprising:

an air return vent located on said one side, said vent including a plurality of vent holes extending therethrough and spaced across the surface of said air return vent whereby air is drawn through said air return vent in response to a drawing force exerted by said blower, the number of said vent holes in a given unit area of said air return vent being generally inversely proportional to the drawing force exerted upon said given unit area, wherein said air return vent includes a main plate having a plurality of vent holes extending therethrough and substantially uniformly spaced across the surface of said main plate, and further includes a block plate mounted on said main plate in covering relation thereto, said block plate thereby blocking ones of said vent holes in said main plate which are within the periphery of said block plate, whereby air is drawn through remaining ones of said vent holes in said main plate in response to a drawing force exerted by said blower, said block plate having a peripheral configuration such that the number of said vent holes in a given unit area of said air return vent is generally inversely proportional to the drawing force exerted upon said given unit area.

16. The improvement of claim 15, wherein said block plate has a generally trapezoidal peripheral configuration.

17. A bakery oven comprising:
 a baking chamber defined by a plurality of walls;
 a heat source for heating air received from said baking chamber;
 a blower for receiving heated air from one side of said chamber and directing an air stream to an opposite side of said chamber;
 an air inlet vent located on said opposite side and comprising a front plate and a spacer apart rear plate, and means positioned between said plates for imparting a substantially uniform flow to said air stream in a direction substantially perpendicular to the plane of said air vent, and toward said one side, as said air stream moves from said opposite side to said one side; and
 a plurality of vent holes extending through said plates.

18. The bakery oven of claim 17, including an air return vent located on said one side, said vent having a main plate in which a plurality of vent holes are provided and a block plate mounted on said main plate and covering relation thereto, said block plate thereby blocking ones of said vent holes in said main plate which are within the periphery of said block plate, whereby air is drawn through remaining ones of said vent holes in said main plate in response to a drawing force exerted by said blower, said block plate having a peripheral configuration such that the number of said vent holes in a given unit area of said air return vent is generally inversely proportional to the drawing force exerted upon said given unit area.

19. The bakery oven of claim 17, wherein said flow imparting means includes a series of first slats spaced in a first direction and extending in a second direction, and a series of second slats spaced in a direction at an angle to said first direction and extending in an direction at an angle to said second direction, thereby defining a plurality of ducts each extending substantially directly towards said one side of the baking chamber, whereby air passing through said ducts will be directed substantially directly towards said one side of the baking chamber.

* * * * *